United States Patent [19]

Shimada et al.

[11] 4,428,077

[45] Jan. 24, 1984

[54] LINE RECOGNITION METHOD

[75] Inventors: Shigeru Shimada; Shigeru Kakumoto, both of Kodaira, Japan

[73] Assignee: Hitachi, Ltd., Tokyo, Japan

[21] Appl. No.: 181,774

[22] Filed: Aug. 27, 1980

[30] Foreign Application Priority Data

Sep. 3, 1979 [JP] Japan .............................. 54-111761
Sep. 5, 1979 [JP] Japan .............................. 54-112876

[51] Int. Cl.³ ............................................. G06K 9/00
[52] U.S. Cl. ......................................... 382/9; 382/22; 382/44
[58] Field of Search ............. 340/146.3 AE, 146.3 H, 340/146.3 F, 146.3 AH; 250/203 R; 382/44, 21, 22, 60, 9

[56] References Cited

U.S. PATENT DOCUMENTS

| | | | |
|---|---|---|---|
| 3,805,237 | 4/1974 | Cobb et al. | 340/146.3 H |
| 3,848,089 | 11/1974 | Stewart | 340/146.3 AE |
| 4,092,632 | 5/1978 | Agulnek | 340/146.3 F |
| 4,147,928 | 4/1979 | Crean et al. | 382/44 |
| 4,249,217 | 2/1981 | Korte et al. | 382/44 |
| 4,272,756 | 6/1981 | Kakumoto et al. | 382/44 |
| 4,284,975 | 8/1981 | Odaka | 340/146.3 J |

*Primary Examiner*—Leo H. Boudreau
*Attorney, Agent, or Firm*—Antonelli, Terry & Wands

[57] ABSTRACT

In a pattern recognition apparatus for recognizing a pattern including a line pattern consisting of a plurality of line segments, there is proposed a line recognition method which comprises steps of: recognizing the coordinates of end points of each of segments constituting a line pattern; employing the coordinates of an end point of a first line segment as base point coordinates; deciding whether the distance between the base point and an end point of a second line segment is less than a certain value or not; employing as a suitable point the end point of the second line segment with said distance being less than the certain value; and selecting a connectable second line segment and connecting said suitable point to the base point of the first line segment.

19 Claims, 34 Drawing Figures

FIG. 8
| | |
|---|---|
| 2   NUMBER OF FEATURE POINTS OF SEGMENTS | |
| SI ONE END POINT INFORMATION | |
| EI OTHER END POINT INFORMATION | SEGMENT $L_1$ |
| $(x_1, y_1)$ ONE END POINT | |
| $(x_2, y_2)$ OTHER END POINT | |
| 3 | |
| SI | |
| EI | |
| $(x_1, y_1)$ ONE END POINT | SEGMENT $L_2$ |
| $(x_2, y_2)$ INFLECTION POINT | |
| $(x_3, y_3)$ OTHER END POINT | |
| 2 | |
| SI | |
| EI | SEGMENT $L_3$ |
| $(x_1, y_1)$ | |
| $(x_2, y_2)$ | |
FIG. 10
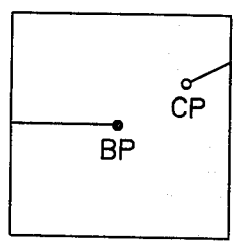
FIG. 11
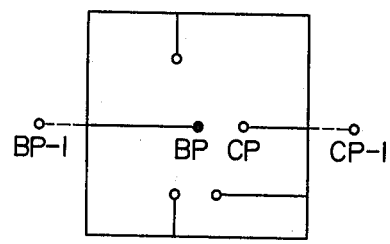

FIG. 16
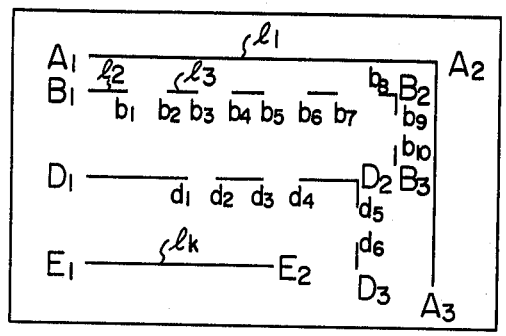
FIG. 17
$\ell_1$ ($n_1$, $A_1$, $A_2$, $A_3$)
$\ell_2$ ($n_2$, $B_1$, $b_1$)
$\ell_3$ ($n_3$, $b_2$, $b_3$)
　　　⋮
$\ell_k$ ($n_k$, $E_1$, $E_2$)
FIG. 18
$L_1$ ($T_1$, $A_1$, $A_2$, $A_3$)
$L_2$ ($T_2$, $B_1$, $B_2$, $B_3$)
$L_3$ ($T_3$, $D_1$, $D_2$, $D_3$)
$L_4$ ($T_1$, $E_1$, $E_2$)
FIG. 19a
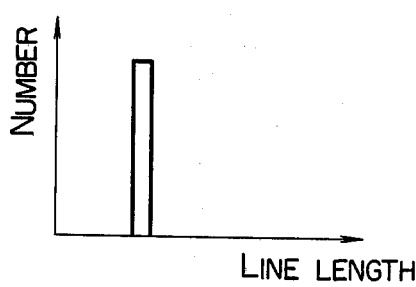
FIG. 19b
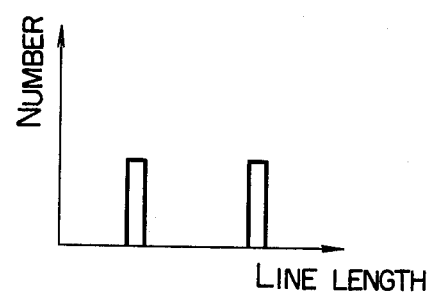
FIG. 19c
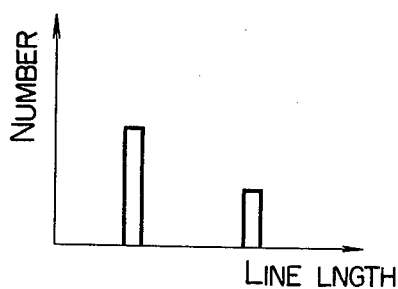
FIG. 19d
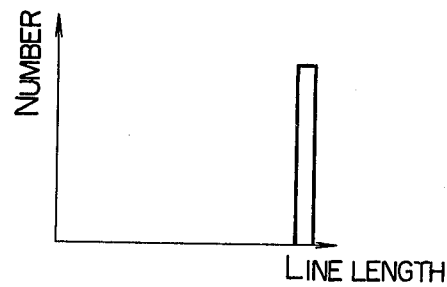

F I G. 28a
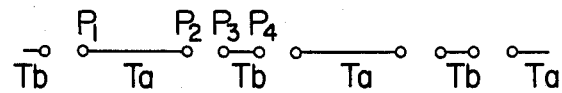
F I G. 28b
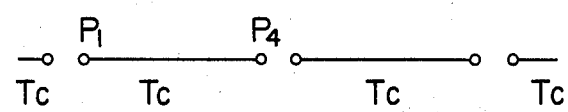
F I G. 29
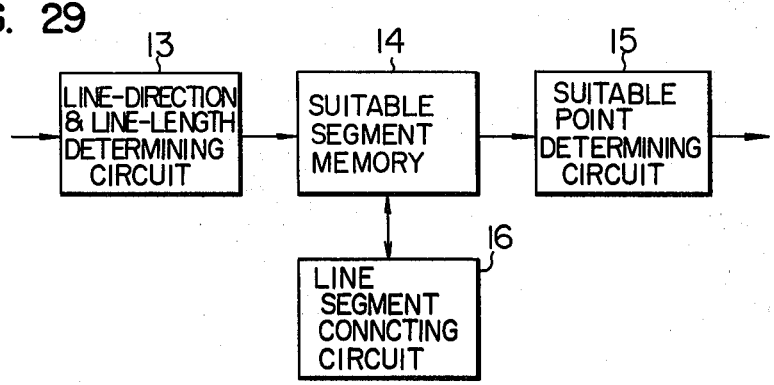
F I G. 30
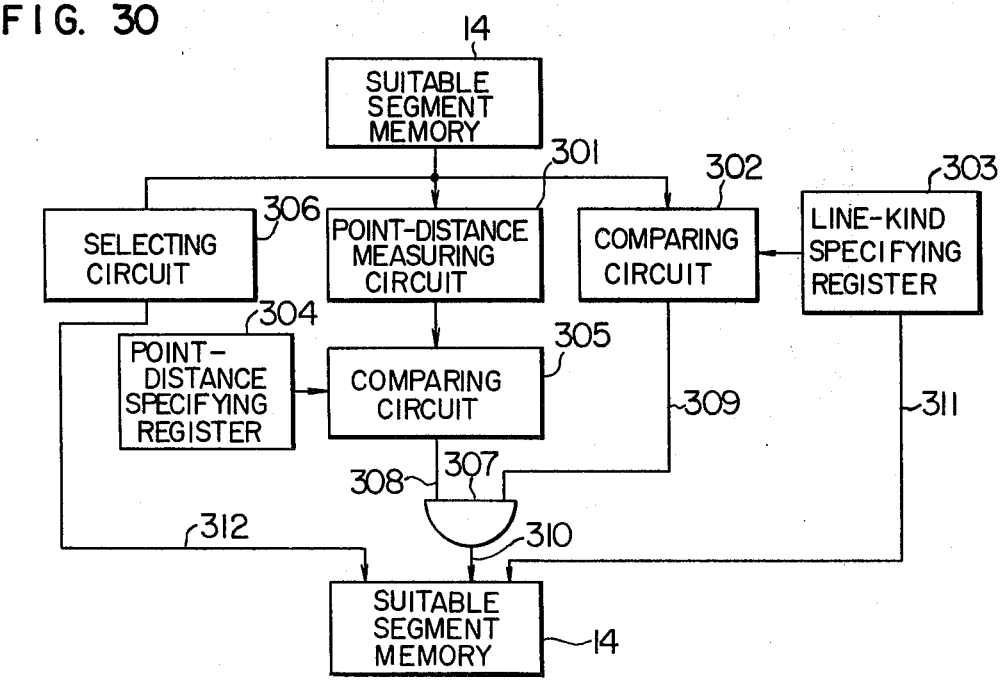

LINE RECOGNITION METHOD

BACKGROUND OF THE INVENTION

1. Field of the Invention

This invention relates to pattern recognition devices for recognizing line patterns, and particularly to a line recognition method of recognizing a line pattern consisting of dash lines or chain lines used for specifying different kinds of patterns, i.e., to the recognition of a segmented line form as a single, connected line, not as separate line segments.

2. Descrption of the Prior Art

In various design drawings, the difference between lines is illustrated by changing the kinds of lines used, such as a solid line, a dash line, chain line and the like. Thus, to recognize this design drawing, it is necessary to recognize the dash line, the chain line and the like as a single, connected line. Also, to know the difference between these lines, it is necessary to recognize the form of the line and the path thereof.

There has been used a digitizer or the like for reading a drawing and inputting data to a computer, in which the reading indicator for the coordinates is manually moved to feature points such as end points and inflection or bending points of lines which represent characteristics of the lines so that the read coordinates are stored in the computer. In this case, the identification of the lines is also manually input to the computer by another means. The discrimination of lines in accordance with this conventional method is performed by the human pattern recognition ability and this fact definitely prevents the digitizing operations from being fully automated.

SUMMARY OF THE INVENTION

Accordingly, it is an object of the invention to provide a method of automatic recognition of dash lines or chain lines in a pattern recognition device as a single line pattern.

In order to achieve the above object, the present invention proposes a line recognition method comprising the steps of: recognizing the coordinates of the end points and or bending points of each of plural line segments constituting a dash line or chain line; selecting an end point of a particular line segment as a base point; the end points of the other line segments present within a prdetermined range with its center being the base point; and connecting the line segments having the detected end points to the particular line segment.

BRIEF DESCRIPTION OF THE DRAWINGS

FIGS. 7 and 8 are explanatory diagrams useful for explaining the operation of the circuit of FIG. 6.

FIGS. 10 to 14 are diagrams showing the principle of selection of connectable points according to the present invention.

FIGS. 16 to 19a–19d are explanatory diagrams for explaining the operation of the device of FIG. 15.

FIGS. 28a and 28b are explanatory diagrams of one-dot chain line having different-line-length segments, and a dash line resulting from connecting the adjacent different segments of the one-dot chain line, respectively.

FIG. 29 is a block diagram of another embodiment of the dash line tracking device according to the invention.

FIG. 30 is a block diagram of an example of the different line-kind connecting circuit 15 in FIG. 29.

DETAILED DESCRIPTION OF THE PREFERRED EMBODIMENTS

Figure 1:
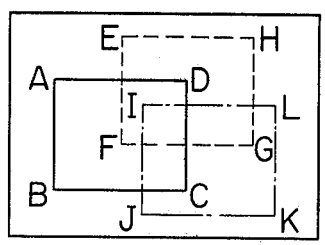
FIGS. 1 to 4 are explanatory diagrams useful for explaining the drawing to be recognized.
Figure 2:
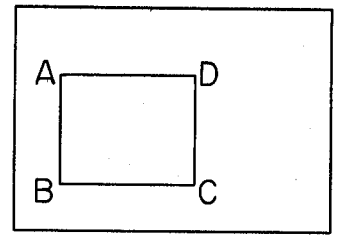
Figure 3:
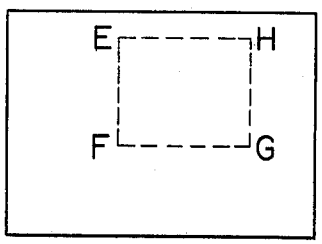
Figure 4:
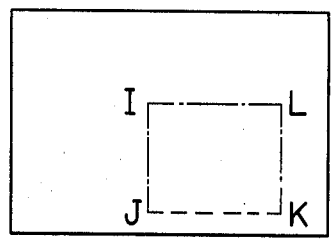
Figure 5:
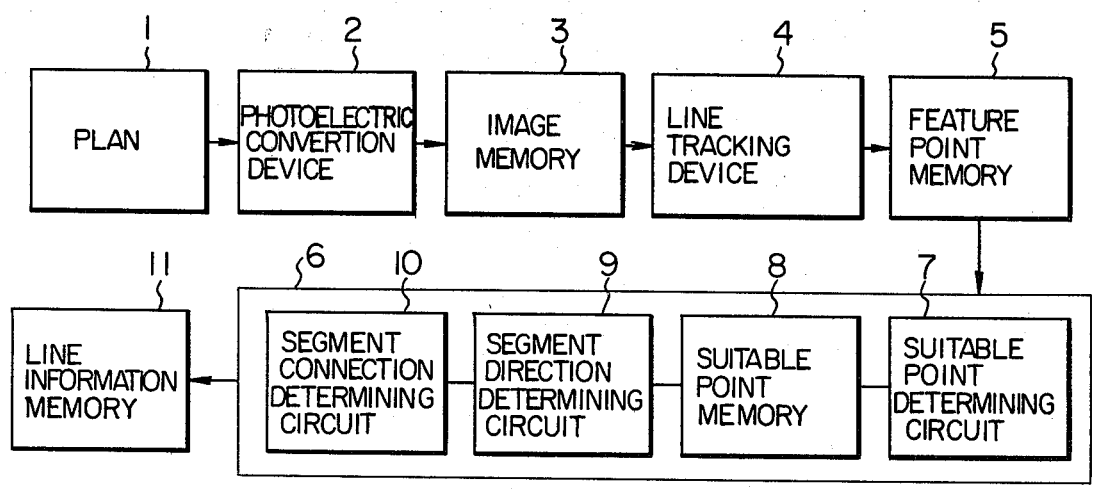
FIG. 5 is a schematic block diagram of one embodiment of the pattern recognition device according to the invention.

FIG. 1 illustrates a plan to be recognized, including a solid-line pattern ABCD, a dash-line pattern EFGH, and a one-dot chain line pattern IJKL. FIG. 2 shows the solid line pattern ABCD, FIG. 3 the dash-line pattern EFGH, and FIG. 4 the one-dot chain line pattern IJKL. In order to selectively recognize the dash-line pattern EFGH in FIG. 1 as the pattern EFGH in FIG. 3, and the one-dot chain pattern IJKL in FIG. 1 as the pattern IJKL in FIG. 4, the line segments must be traced beyond the gaps along the direction of each dash or chain line. FIG. 5 is a block diagram of one embodiment of the pattern recognition device according to the invention which performs this function.

Referring to FIG. 5, there are shown a plan 1 to be recognized, a photo-electric conversion device 2, an image memory 3, a line tracking device 4, a feature point member 5, a dash line tracking device 6, a suitable or candidate point determining circuit 7, a suitable or candidate point memory 8, a segment direction determining circuit 9, a segment connection determining circuit 10, and a line information memory.

Video information from the plan 1 to be recognized as shown in FIG. 1 is converted to a binary electrical signal by the photo-electric conversion device 2 such as a television camera, and this data is then temporarily stored in the image memory 3. Then, the line tracking device 4 acts to recognize the paths of the solid line and the line segments of the dash or chain line from the information stored in the image memory 3 and to extract the feature points of the solid-line segments, which define the respective segments, more specifically the end points at which a segment terminates, and the inflection or bending points at which the segment changes its direction. The feature points are then stored in the feature point memory 5. In this case, the line segments constituting the dash line or chain line are stored as separate solid lines. The line tracking device 4 uses the technique of reducing the thickness of a picked-up line image as shown in FIG. 7, as also used in the conventional character reader, such as disclosed in Japanese Patent Publication No. 21255/1963.

In the dash line tracking device 6 according to the invention, the suitable point determining circuit 7 sets a small region around an end point of a particular line segment, which end point is regarded as a base point using data stored in the feature point memory 5, for example, the first stored end point, and examines whether the end points of the other line segments are present within this region. If one end point is present, the end point is selected. Otherwise, the distance between the end point of each segment and the base point is calculated. If the distance is smaller than a constant threshold value, the end point is regarded as a suitable point and is transferred to the suitable point memory 8 together with the other end point or inflection point adjacent to the end point on same line segment. At the same time, the other end point and inflection or end point adjacent thereto on the same line segment are also transferred to the memory 8. The segment direction determining circuit 9 functions to calculate the angles of the vector the line segment including the base point, the vector from the base point to the suitable point and the line segment vector including the suitable point with respect to the reference vector (here, the horizontal axis) on the basis of the points stored in the suitable point memory 8, and to decide whether or not these angles are less than a constant reference value. The segment connection determining circuit 10 determines whether or not the two line segments are to be connected, based on the previous decision, and supplies the result to the line information memory 11.

Figure 6:
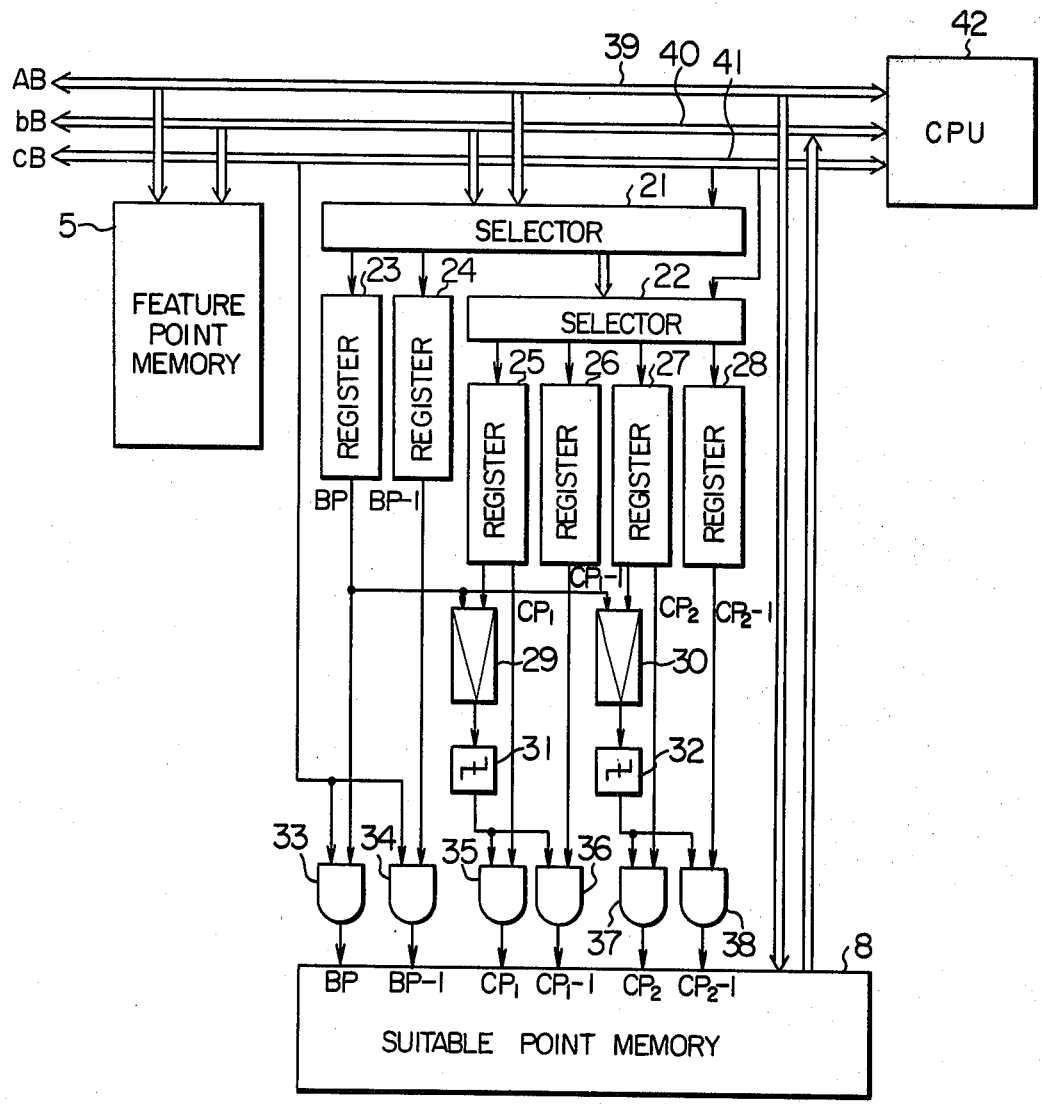
FIG. 6 is a schematic diagram of the suitable point determining circuit in FIG. 5.

FIG. 6 shows a specific arrangement of the suitable point determining circuit 7 within the dash line tracking device 6 of FIG. 5. Shown at 21 and 22 are selectors, 23 to 28 registers, 29 and 30 comparators, 31 and 32 thresholding circuits, 33 to 38 AND gates, 39 an address bus, 40 a data bus, 41 a control bus, and 42 a central processing unit (CPU).

Figure 7:
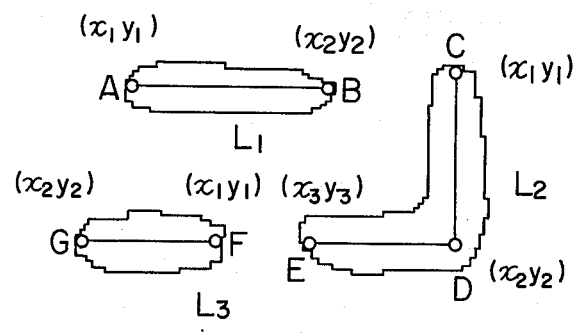

When a segment of video information as shown in FIG. 7 is applied to the photo-electric conversion device 2, the line tracking device 4 recognizes the information and supplies data as shown in FIG. 8 to the feature point memory 5. That is, for each of the line segments $L_1$ to $L_3$, the number of feature points in the segment, end point information, and the coordinates of inflection points and end points are stored in the memory 5.

The number of feature points of a segment shows the total number of end points and inflection points, and the end point information represents flags provided at the end points.

The contents of the feature point memory 5 are read in response to the addresses on the address bus 39 which the CPU 42 specifies. The contents are supplied to and classified by the selectors 21 and 22 through the data bus 40. In FIG. 6, BP represents a base point, and BP-1 denotes an end point or inflection point adjacent to the point BP on the same line segment including the base point BP. $CP_1$ represents one end point on an adjacent line segment to be searched, $CP_1$-1 an end point or inflection point adjacent to the point $CP_1$ on the same line segment including the point $CP_1$, $CP_2$ the other end point on the line segment to be searched and $CP_2$-1 the end point or inflection point adjacent to the point $CP_2$ on the same line segment including the point $CP_2$. The selector 21 operates when the address bus 39 transfers the addresses corresponding to the coordinates of points BP and BP-1, to supply the data on the data bus 40, i.e., the coordinates of point BP and BP-1 to the registers 23 and 24 respectively. On the other hand, the selector 22 operates to transmit the coordinates of the points $CP_1$, $CP_1$-1, $CP_2$ and $CP_2$-1, to the registers 25, 26, 27 and 28, when the address bus specifies the addresses of these points. The comparator 29 computes the distance between the points BP and $CP_1$ in the vertical and horizontal directions, that is, $E_1 = (BP - CP_1)$.

The comparator 30 computes the value of $E_2 = (BP - CP_2)$. The thresholding circuit 31 produces an ON-signal when the value $E_1$ is smaller than a parameter $\epsilon_1$ which defines the preliminarily selected suitable region. Likewise, the thresholding circuit 32 produces an ON-signal when the value $E_2$ is smaller than the parameter $\epsilon_1$. The signals from the thresholding circuits 31 and 32 and the contents of the registers 25 to 28 are applied to the AND gates 35 to 38 as illustrated. The outputs of the AND circuits 35 to 38 are applied to the suitable point memory 8. The address in the suitable point memory 8 is set up by the CPU 42 through the address bus 39. As a result, in the suitable point memory 8 are stored in turn the coordinates of the points BP, BP-1, $CP_i$ and $CP_i$-1 (i=1 or 2). Similarly, the points $CP_i$ and $CP_i$-1 for the next line segment are set up with the points BP and BP-1 kept fixed, and the above operation is repeated.

As will be described later, after the base point BP of the search on an i-th line segment is connected to an appropriate suitable point on the (i+1)th line segment, the search base point is moved to the other end point on the (i+1)th line segment in which the selected suitable point (end point) is present, in order to further trace the line segments continuously thereto. The requirements for the new search base point are the same as the conditions established for the previous search base point, and it is necessary that the point has no flag at the end point inforamtion. If the point with flag appears as the search base point for the next search, it means that the connected dash or chain line reaches an isolated end point or forms a loop with no isolated end point. These operations are controlled by the CPU 42.

Figure 9:
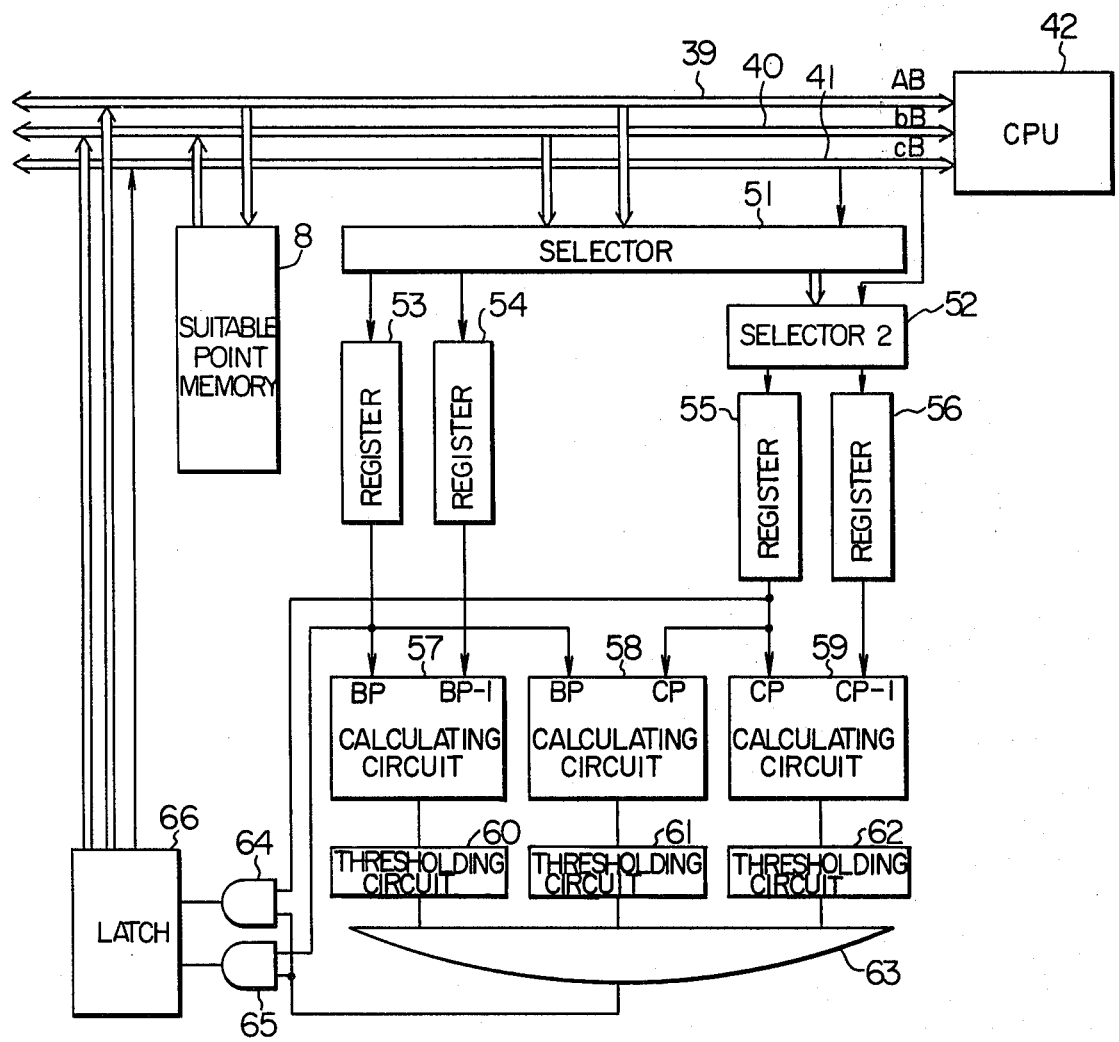
FIG. 9 is a construction schematic diagram of the segment direction determining circuit and segment connection determining circuit in FIG. 5.

FIG. 9 is a specific arrangement of the segment direction determining circuit 9 and segment connection determining circuit 10 within the dash line tracking device 6 of FIG. 5. Shown at 51 and 52 are selectors, 53 to 56 registers, 57 to 59 calculating circuits, 60 to 62 thresholding circuits, 63 to 65 AND gates and 66 a latch circuit.

Before description of the circuit operation, the principle of selecting a suitable point to be connected will first be mentioned.

Figure 12:
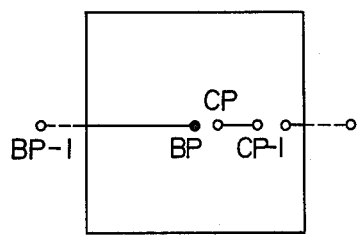
Figure 13:
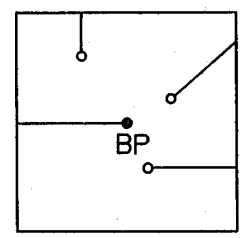
Figure 14:
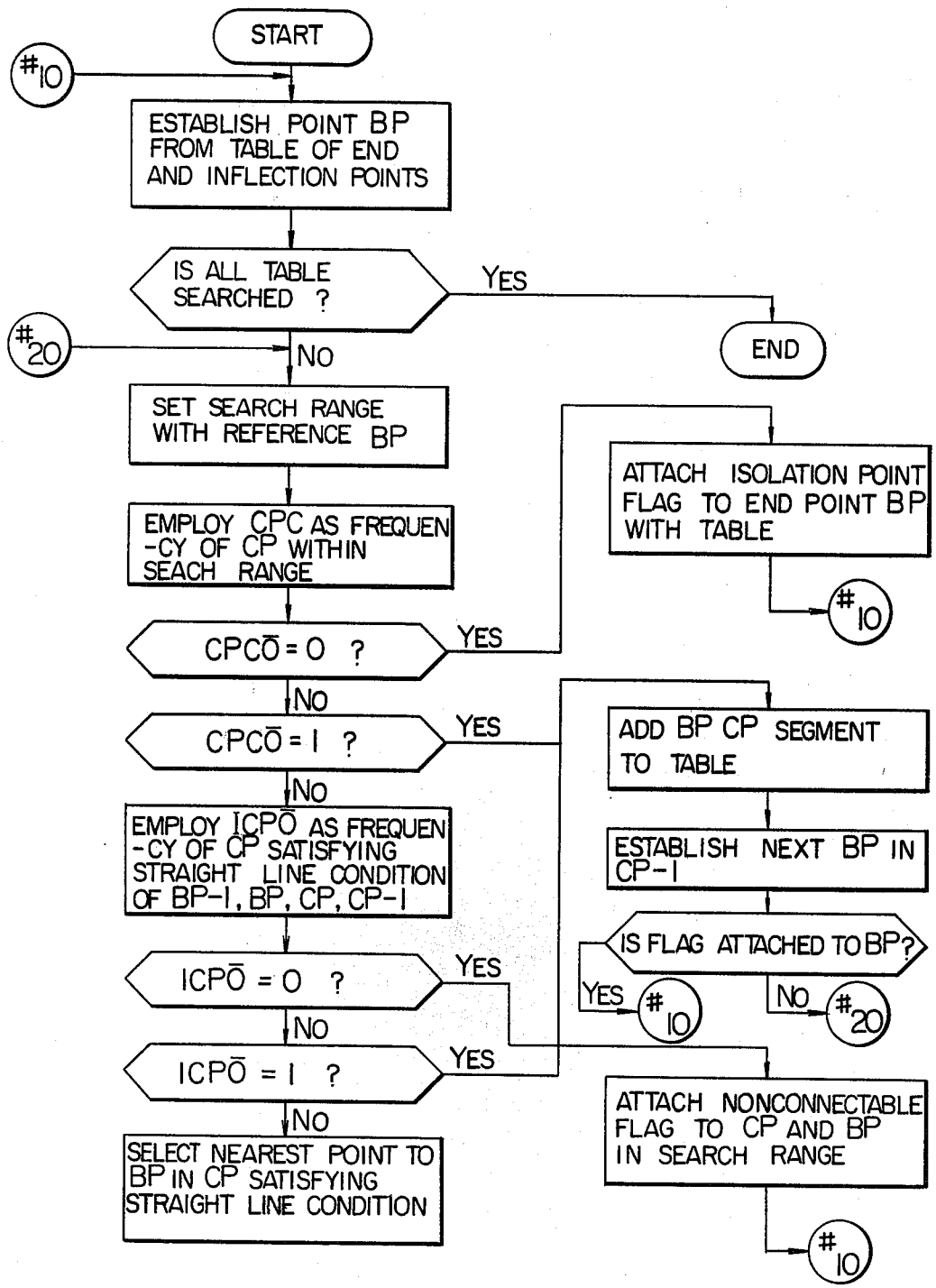

When a single suitable point CP is found in the search region as shown in FIG. 10, the point CP is connected to the search base point BP. If a plurality of suitable points CP are found in the search region as seen in FIG. 11, the connectable conditions are examined. In other words, denoting a feature point adjacent to the point BP on the segment along which the search base point BP is present as BP-1 and the point adjacent to the points CP on the segment along which a suitable point CP is present, as CP-1, examination is made as to whether or not the four points BP, BP-1, CP and CP-1 are disposed on a straight line. If only one point is present which satisfies this straight-line condition of four points as shown in FIG. 11, this point CP is selected as a connectable point. If a plurality of points are present for which satisfy the straight line condition of 4 points as shown in FIG. 12, the distances between the points BP and CP are calculated and the point CP of the smallest distance is considered as a connectable point. If a plurality of suitable points are present but no straight line condition is satisfied as shown in FIG. 13, a connection inability flag is attached to the points CP and BP which are disposed in a small region. If no suitable point is present in the small region for the suitable point search, an isolation flag is attached to the end point information of the search base point. The selection algorithm of the suitable point to be connected is executed by the CPU 42, and the flow diagram is shown in FIG. 14. The suitable point memory 8 stores the output of the suitable point determining circuit 7 as shown in FIG. 6, the address thereto is set up by the CPU 42 through the address bus 39. The contents read from the memory 8 at that address are applied through the data bus 40 to and classified by the selectors 51 and 52. The selector 51 is operated by the signal applied through the control bus 41 from the CPU 42 when the data on the data bus 40 correspond to the points BP and BP-1, to supply the coordinates of point BP to the register 53, and the coordinates of point BP-1 to the register 54. The selector 52 is operated by the control signal when the data on the data bus 40 corresponds to the coordinates of points CP and CP-1, to supply the coordinates of point CP to the register 55, and the coordinates of the point CP-1 to the register 56. The calculating circuits 57 to 59 function to compute the angle between the line segment consisting of two points and the reference vector (in this case, horizontal axis). If the coordinates of two points are represented by $(x_1, y_1)$, and $(x_2, y_2)$, respectively, the following expression, $$\Delta = \frac{(X_2 - X_1)^2}{(X_2 - X_1)^2 + (Y_2 - Y_1)^2}$$

is calculated. This expression means the square of the inner product. The calculating circuit 57 performs the calculation of this expression for the coordinates of the points BP and BP-1, the calculating circuit 58 calculates for the coordinates of the points BP and CP, and the calculating circuit 59 calculates for the coordinates of the points CP and CP-1. The results of calculation are assumed to be $\Delta$BPBP-1, $\Delta$BPCP and $\Delta$CPCP-1 respectively.

The thresholding circuits 60 to 62 generate an ON-signal when the results are smaller than a constant value, respectively. In other words, the thresholding circuit 60 generates an ON-signal when the value of $\Delta$BPBP-1 is smaller than a constant value $\epsilon_2$, the thresholding circuit 61 generates an ON-signal when the value of $\Delta$BPCP is smaller than the constant value $\epsilon_2$, and the thresholding ciruit 62 generates an ON-signal when the value of $\Delta$CPCP-1 is smaller than the constant value $\epsilon_2$. The outputs of the three thresholding circuits 60 to 62 are applied to an AND gate 63, the output of which gates the signals of BP and CP from the registers 53 and 54 in gates 64 and 65. Thus, the points BP and CP are stored in the latch circuit 66 as a pair of connectable points.

Figure 15:
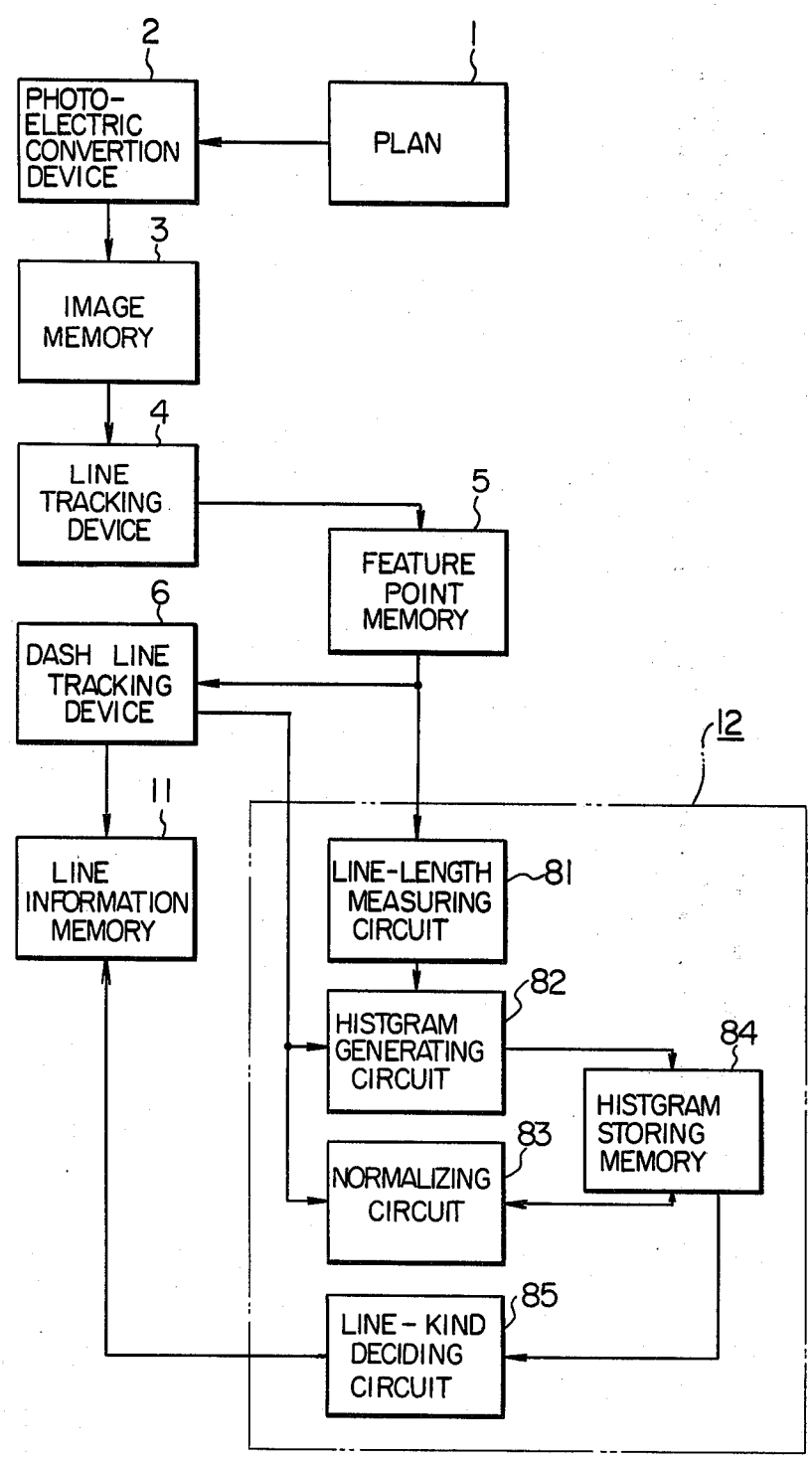
FIG. 15 is a schematic diagram of another embodiment of the pattern recognition device according to the invention.

FIG. 15 is another embodiment of the pattern recognition apparatus according to the invention in which the kind of line can be discriminated. Shown at 1 is the plan to be recognized, 2 the photo-electric conversion device such as a television camera, 3 the image memory, 4 the line tracking device, 5 the feature point memory, 6 the dash line tracking device, 11 the line information memory, and 12 a line-kind determining device.

The line-kind determining device 12 includes a line-length measuring circuit 81, a histogram generating circuit 82, a normalizing circuit 83, a histogram storing memory 84 and a line-kind deciding circuit 85.

Description will be made of the case when the plan 1 as shown in FIG. 16 is read with such arrangement.

The plan 1 is picked up by the photo-electric conversion device 2, the electrical signal from which is stored in the image memory 3. The data in the memory 3 is read in turn by the line tracking device 4, and the coordinates of the end and inflection points of each of the line segments and the number thereof are recognized thereby. The results from the line tracking device 4 are stored in the feature point memory 5. That is, in the line tracking device 4, all the line segments are treated as solid lines. If, for example, the line segments $l_l$ to $l_k$ as shown in FIG. 16 are recognized with the numbers of feature points thereof being $n_l$ to $n_k$, data as shown in FIG. 17 is stored in the feature point memory 5. The line tracking device 4 can easily be realized by the same line extracting means as used in the optics, character reader and the like, similarly to FIG. 5.

The dash line tracking device 6 sequentially reads the data stored in the memory 5, similarly to FIG. 5 and connects the line segments of dash line or chain line. Specifically, information of a predetermined line segment is read from the feature point memory 5 and makes the end point of a segment a search base point BP. Moreover, the following conditions are examined; whether the end point of the line segment next read is present in a predetermined region around the search base point BP; or whether the end point is present within a predetermined distance from the search base point BP, and whether the direction of both segments and of the line connecting the end points of both segments are approximately the same. The line segment satisfying the above conditions is considered to be suitable and is stored in the line information memory 11. A signal showing that the line segment read from the feature point memory 5 is connectable is transmitted to the line kind determining device 12.

If the line segment read from the memory 5 is connectable, the other end point opposite to the point to be connected to the above-mentioned search base point is set up as new search base point, and the relation with the line segment read next is examined as described above. Thus, the above operations are repeated for all the line segments of the memory 5, and thereby line segments of a single dash or chain line are connected. This connected line is expressed as a solid line, the path of such a line is tracked to obtain the end points and inflection points. To determine the path of the next line, it is necessary to perform the same operations with the end point of a certain line segment used as the search base point. The dash line tracking device 6 can be constructed by the device as shown in FIGS. 6 and 9. This dash line tracking device and a computer alone enable the above operation to be performed according to the program of the computer.

On the other hand, the line kind determining device 2 functions to discriminate the kind of line, such as a solid line, a dash line, a chain line and the like according to the invention. Each time information of the line segment stored in the feature point memory 5 is applied to the dash line tracking device 6, the information is also applied to the line-kind determining device 12. This information and the connection information transmitted from the dash line tracking device 6 are used to determine the kind of the corresponding line, and the result is stored in the line information memory 11 together with the end point and inflection point information from the tracking device 6. Thus, data as shown in FIG. 18 is stored in the memory 11. In FIG. 18, $T_1$ to $T_3$ are indications of the kinds of line, and $L_1$ to $L_4$ are the lines.

The operation of the line kind determining device 12 will hereinafter be described with reference to FIG. 15.

The line-length measuring circuit 81 determines the line length of each line segment from the end and inflection point information of each segment read from the memory 5. The result of determination is applied to the histogram generating circuit 82. This histogram generating circuit 82 is supplied with the connection information indicating whether the corresponding line segment is connectable or not, from the tracking device 6 and with the line length information from the measuring circuit 81 as data for determining the number of occurence of respective line length information. Similarly, line length is determined for each line segment read in sequence, and is applied to the histogram generating circuit 82 each time the connection information is applied to the circuit 82. Then, this circuit 82 makes a histogram of the number of occurrences as a function of line length from the data of the occurence of respective line length information. This histogram is stored in the memory 84.

The normalizing circuit 83 counts the number of connection information signals transmitted from the tracking device 6 and normalizes the histogram stored in the memory 84 by use of the total count. Thus, the rate at which a segment of a certain line length appears can be expressed in percentage.

FIGS. 19a to 19d show examples of the histogram thus determined, in which FIG. 19a shows the histogram of dash line, FIG. 19b of one-dot chain line, FIG. 19c of two-dot chain line, and FIG. 19d of solid line. In FIG. 19d, line length longer than a predetermined length is treated as a constant value.

From the graphs it will be understood that dash and solid lines have a single hump characteristic, taking a relatively short line length peak and a relatively long line length peak, respectively. In addition, the one-dot chain line has two humps of equal height and the two-dot chain line has two humps of different heights in which the shorter-length hump is twice as high as the longer-length hump.

Accordingly, the kind of line can be determined by examining the number, position and height of humps in the histogram. This examination is performed in the line-kind determining circuit 85 each time a line path is recognized, and the result is stored in the line information memory 7.

Figure 20:
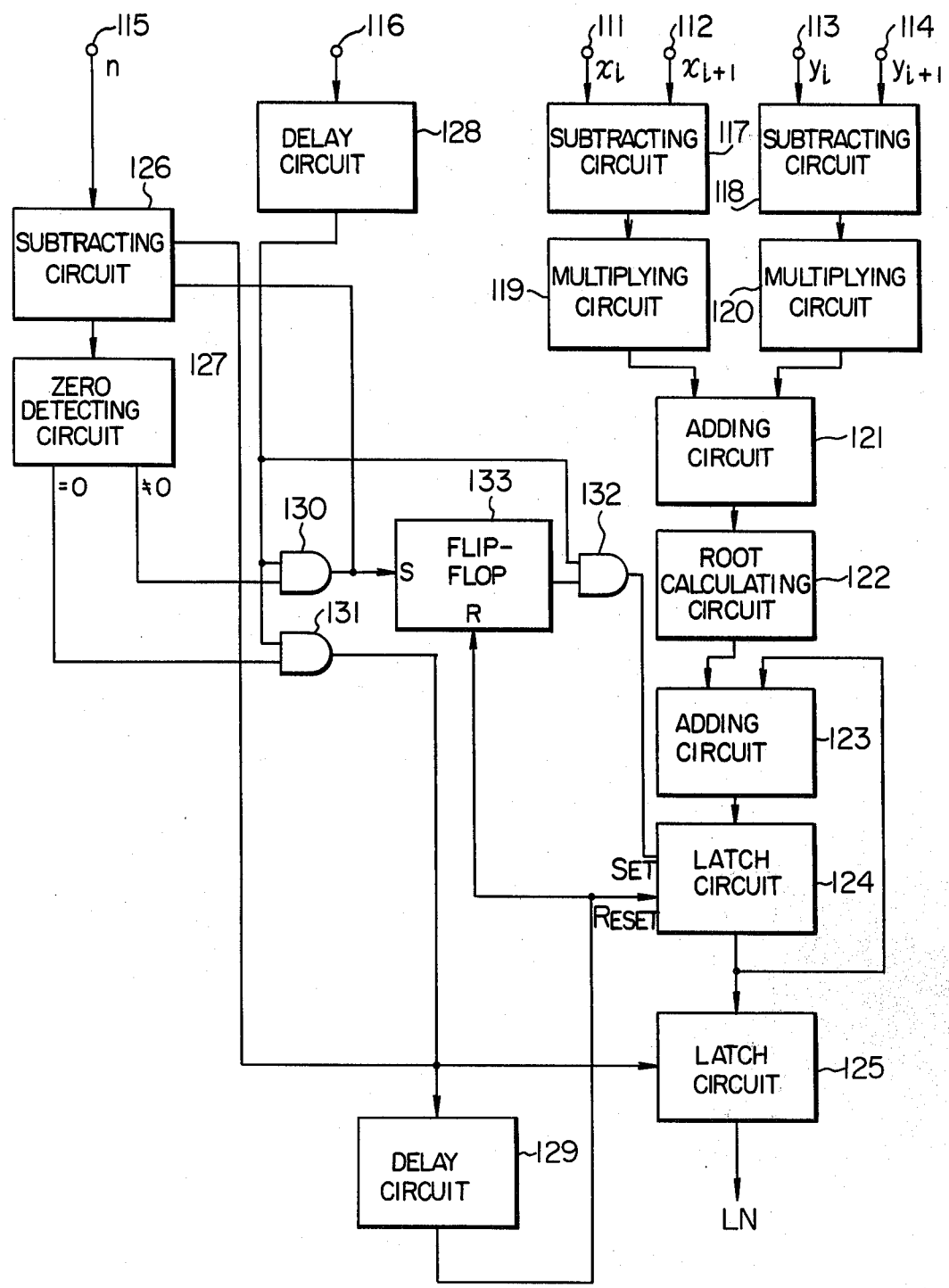
FIG. 20 is a schematic diagram of a specific arrangement of the line-length measuring circuit in FIG. 15.
Figure 21:
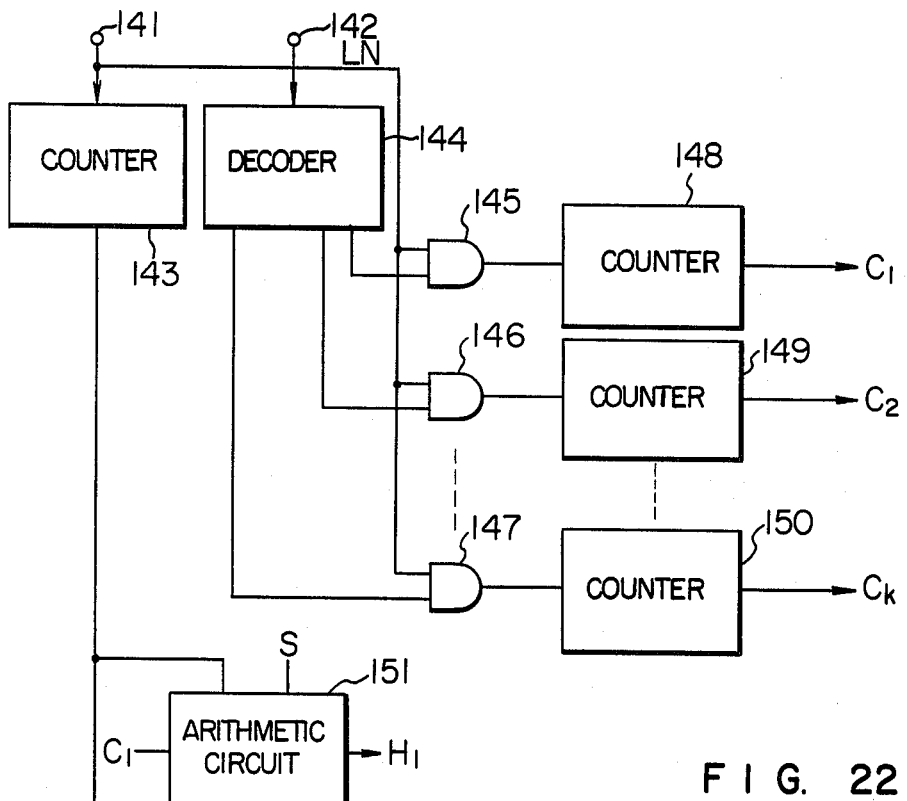
FIG. 21 is a schematic diagram of a specific arrangment of the histogram generating circuit and normalizing circuit in FIG. 15.
Figure 22:
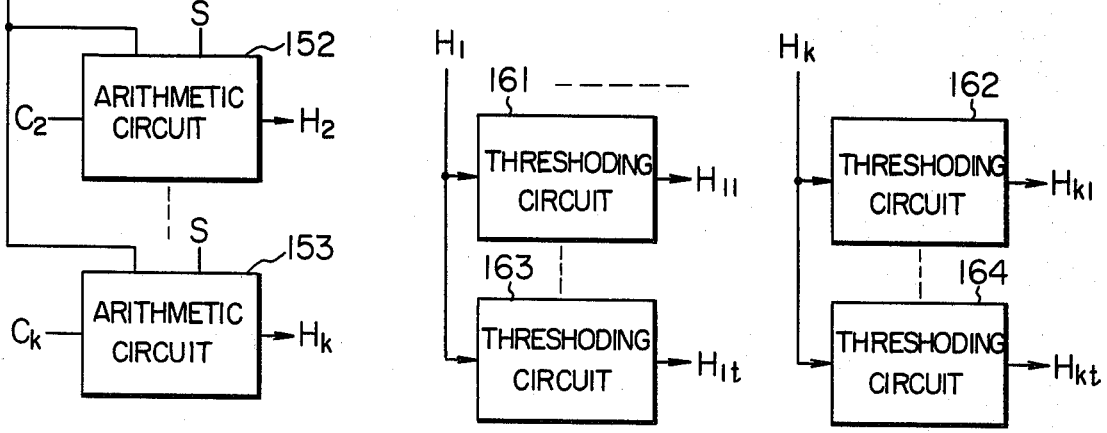
FIG. 22 is a schematic diagram of a specific arrangement of the line-kind determining circuit in FIG. 15.
Figure 22:
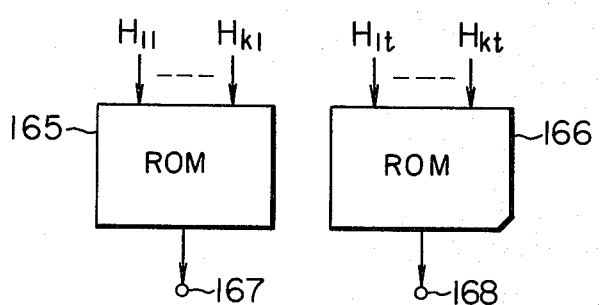

FIGS. 20 to 22 show specific arrangements of the circuits in the line kind determining device 12 of FIG. 15. FIG. 20 shows the construction of the line length measuring circuit 81, FIG. 21 the construction of the histogram generating circuit 82 and normalizing circuit 83, and FIG. 22 the construction of the line kind determining circuit 85.

Referring to FIG. 20, there are shown input terminals 111, 112, 113 and 114 to which are applied the x and y coordinates of the end points or inflection points of line segments read from the feature point memory 5. To the input terminals 111 and 113 are applied the coordinates $x_i$ and $y_i$ of a certain end point or inflection point, and to the input terminals 112 and 114 are applied the coordinates $x_{i+1}$ and $y_{i+1}$ of the next end point or inflection point. Shown at 115 is an input terminal to which the number n of feature points of a line segment is applied, 116 an input terminal to which a memory read strobe signal is applied, 117 and 118 subtracting circuits, 119 and 120 multiplying circuits, 121 and 123 adding circuits, 122 a root calculating circuit, 124 and 125 latch circuits, 126 a subtracting counter, 127 a zero detecting circuit, 128 and 129 delay circuits, 130 to 132 AND gates and 133 a flip-flop.

By the application of a memory read strobe signal such as applied to the input terminal 116 from the memory 5, then are read the number n of feature points and the x and y coordinates $x_i$ and $y_i$ of an end point, which are then being applied to the input terminals 115, 111 and 113. The number n of points is applied to the counter 126, and thus the zero detecting circuit 127 supplies to the AND gate 130 a signal indicating when the contents of the counter 126 are not zero. After lapse of a constant time, the delay circuit 128 supplies a signal to open the AND gate 130. Thus, the counter 126 counts down by one, and the flip-flop 133 is set. Before the flip-flop 133 produces a set signal, the strobe signal disappears from the output of the delay circuit 28 and hence the AND gate 132 is not opened. When the next memory read strobe is applied to the input terminal 116, the x and y coordinates $x_{i+1}$ and $y_{i+1}$ of the next end point or inflection point of the same line segment are applied to the input terminals 112 and 114. Thus, the subtracting circuits 117 and 118, multiplying circuits 119 and 120, adding circuit 121 and root calculating circuit 122 operate to determine the value of $$\sqrt{(x_{i+1} - x_i)^2 + (y_{i+1} - y_i)^2} \ .$$

The delayed memory read strobe is produced from the AND gate 130, and at this time the flip-flop 133 is in a set condition to open the AND gate 132, the output of the calculating circuit 122 being applied through the adding circuit 123 to the latch circuit 124.

When the next strobe is applied, the coordinates of the next end point or inflection point are applied to the input terminals 111 and 113, and the same calculation follows At this time, since the output of the latch circuit 124 is applied to the adding circuit 123, the results of the addition are applied to the latch circuit 124 by the application of the set signal from the AND gate 132. By repeating the operations, the latch circuit 124 produces the following line length $L_N$:

$$L_N = \sum_{i=1}^{n-1} \sqrt{(x_{i+1} - x_i)^2 + (y_{i+1} - y_i)^2}$$

When the counter 126 counts down to zero, the AND circuit 131 produces a signal, and the contents of the latch circuit 124 are transferred to the latch circuit 125 by the next strobe. After lapse of a constant time, the latch circuit 124 is reset by the output of the delay circuit 129.

In this way, the line length $L_N$ of the corresponding line segment is stored in the latch circuit 125.

Referring to FIG. 21, there are shown an input terminal 141 to which is applied the connection information of a corresponding line segment from the dash line tracking device 6 of FIG. 15, an input terminal 142 to which is applied the line length data from the latch circuit 125 in FIG. 20, a counter 143, a decoder 144, AND gates 145 to 147, counters 148 to 150, and arithmetic circuits 151 to 153.

In this arrangement of FIG. 21, the line length data from the latch circuit 125 in FIG. 20 is applied to the decoder 144, which produces an output signal for each line length. This output signal is applied to the AND gates 145 to 147. At this time, when the connection information indicating that the corresponding line segment is connectable is applied through the input terminal 141, the AND gates 145 to 147 are opened to produce outputs, which are counted by the counter 148 to 150 corresponding to respective line lengths. Such operation is repeated for each line segment, and thus the counters 148 to 150 produce data $C_1$ to $C_k$ showing the number of appearances of corresponding line lengths. The data $C_1$ to $C_k$ is stored in the memory 84.

On the other hand, the counter 143 counts the number of the connection information signals, or the number of line segments constituting a line.

After recognition of one line path has been completed, a control signal not shown actuates the arithmetic circuits 151 to 153, which are supplied with the number $C_T$ of the connection line segment from the memory 84, the outputs $C_1$ to $C_k$ from the counters 148 to 150, and a constant value S, for example, 100, and the circuits 151 to 153 perform the following arithmetic operation:

$$H_j = \frac{C_j \times S}{C_T}$$

The values $H_1$ to $H_k$ thus determine each show the rate of appearance of each line length in the normalized histogram. These values are stored in the memory 84.

Referring to FIG. 22, there are shown thresholding circuits 161 to 164, read-only memories (ROM's) 165 and 166, and output terminals 167 and 168. The thresholding circuits 161 and 162 have a certain threshold value $V_1$ and the thresholding circuits 163 and 164 a threshold value $V_t$.

In this arrangement, the rates of appearance $H_1$ to $H_k$ for different line lengths are read out from the memory 84 and compared with a plurality of threshold values $V_1$ to $V_t$ in the thresholding circuits 161 to 164. The output signals $H_{11}$ to $H_{k1}$ and $H_{1t}$ to $H_{kt}$ therefrom are applied to the ROM's 165 and 166 as addresses (identification codes), the outputs of which are applied through the output terminals 167 and 168 as line kind codes T and stored in the line information memory 11 in FIG. 15.

The plurality of ROM's as illustrated may be replaced by one ROM.

While in the above embodiments the line length of each line segment is determined and the histogram showing the rate of appearance of the corresponding line length is made, it is also possible to make the histogram showing the rate of appearance of the respective lengths of the white region between line segments, or the distance between line segments. In this case, information of facing end points of two line segments is applied to the input terminals 111 to 114 in FIG. 20, and the same arithmetic operation is performed, thereby making a desired histogram. This is effective for the case where kinds of lines are made different by the distance between the line segments.

Figure 23:
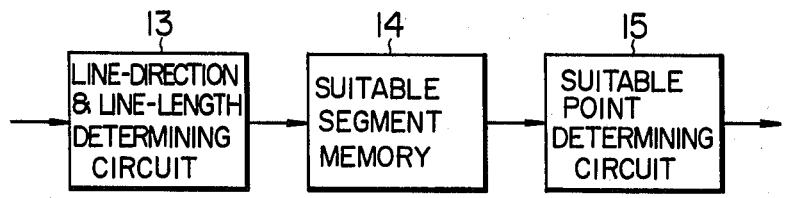
FIG. 23 is a block diagram of an embodiment of the dash line tracking device according to the invention.

FIG. 23 is a partial block diagram of one embodiment of the dash-line tracking device according to the present invention. Shown at 13 is a line-direction & line-length determining circuit, 14 a suitable segment memory, and 15 a suitable point determining circuit. This dash-line tracking device corresponds to the portion 6 of FIG. 5, and the other construction is the same as in FIG. 5.

In the embodiment of FIG. 23, the feature point coordinates of a line segment read from the feature point memory 5 are applied to the line-direction line-length and determining circuit 13, which selects line segments having a desired line-direction and line-length and supplies the result to the suitable-segment memory 14 so that it is stored therein. Then, the suitable-point determining circuit 15 decides whether the end points of two line segments are close or not, for the line segments of equal direction and length stored in the memory 14. If the end points are close to each other, both line segments are connected. In other words, the suitable point determining circuit 15, which may be the same construction as that of the suitable point determining circuit 7 as shown in FIG. 5, selects as a base point, one end point of a segment from the line segments having equal direction and length stored in the suitable segment memory 14, searches an end point of the other line segment existing within a certain region around the base point, performs the connection of the first mentioned segment to a line segment within the predetermined region, and supplies the result to the line-information memory 11.

Figure 24:
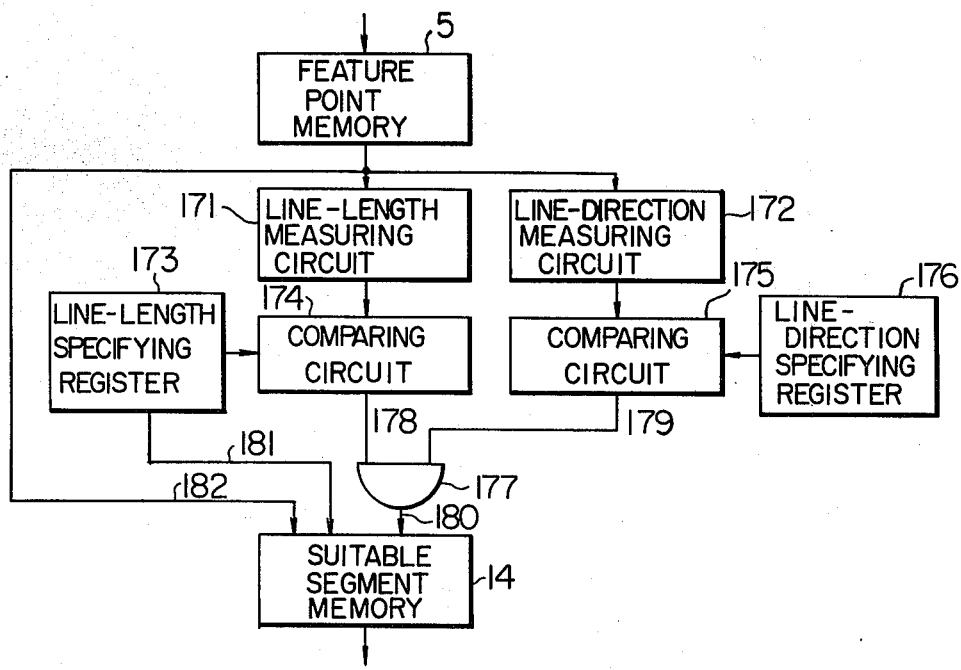
FIG. 24 is a block diagram of an example of the line-direction and line-length determining circuit 12 in FIG. 23.

FIG. 24 is a specific arrangement of the line-direction line-length determining circuit 13 in FIG. 23. Shown at 171 is a line-length measuring circuit, 172 a line direction measuring circuit, 173 a line-length specifying register, 174 and 175 comparing circuits, 176 a line direction specifying register, and 177 an AND gate.

In FIG. 24, the line-length measuring circuit 171 and the line direction measuring circuit 172 respectively measure the length and direction of line segments from the line information, i.e., coordinates of feature points (end points and inflection points) of line segments stored in the feature point memory 5. The line-length specifying register 173 stores in advance the length of a line-segment considered as a dash line and the number identifying a line-kind corresponding to the dash specified line of the line-segment length. Also, the line-direction specifying register 176 stores in advance the direction of a dash line to be connected.

The comparing circuit 174 compares the line length measured by the line-length measuring circuit 171 and the value stored in the line length specifying register 173. If the difference therebeween is within a certain range, the comparing circuit 174 produces an output 178 of "1". The comparing circuit 175 compares the line direction computed by the line direction measuring circuit 172 and the line direction stored in the line direction specifying register 176. If the difference therebetween is within a predetermined range, the comparing circuit 175 produces an output 179 of "1".

When the outputs 178 and 179 of the comparing circuits 174 and 175 are both "1", the AND gate 177 produces an output 180 of "1", in response to which the suitable segment memory 14 stores the line-kind number output 181 of the line length specifying register 173 and the line information output 182 from the feature point memory 5.

The suitable segment memory 14 and the feature point memory 5 can be replaced by a common memory, and in this case, when the output 180 is "1", it is enough to store only the line-kind information.

In case of recognizing a plurality of dash lines having different line-segment length, and a chain line having different line-segment lengths, a plurality of line-length specifying registers 173 and comparing circuits 174 are provided to search line segments of respective line lengths.

In case of searching a plurality of line directions, either a plurality of line-direction specifying registers 176 and comparing circuits 175 are provided, or the contents of the register 176 are renewed.

By these processes, it is possible to determine suitable line segments to connected to be a dash line or chain line.

In FIG. 24, the line-length measuring circuit 171 can be realized by the circuit of FIG. 20.

Figure 25:
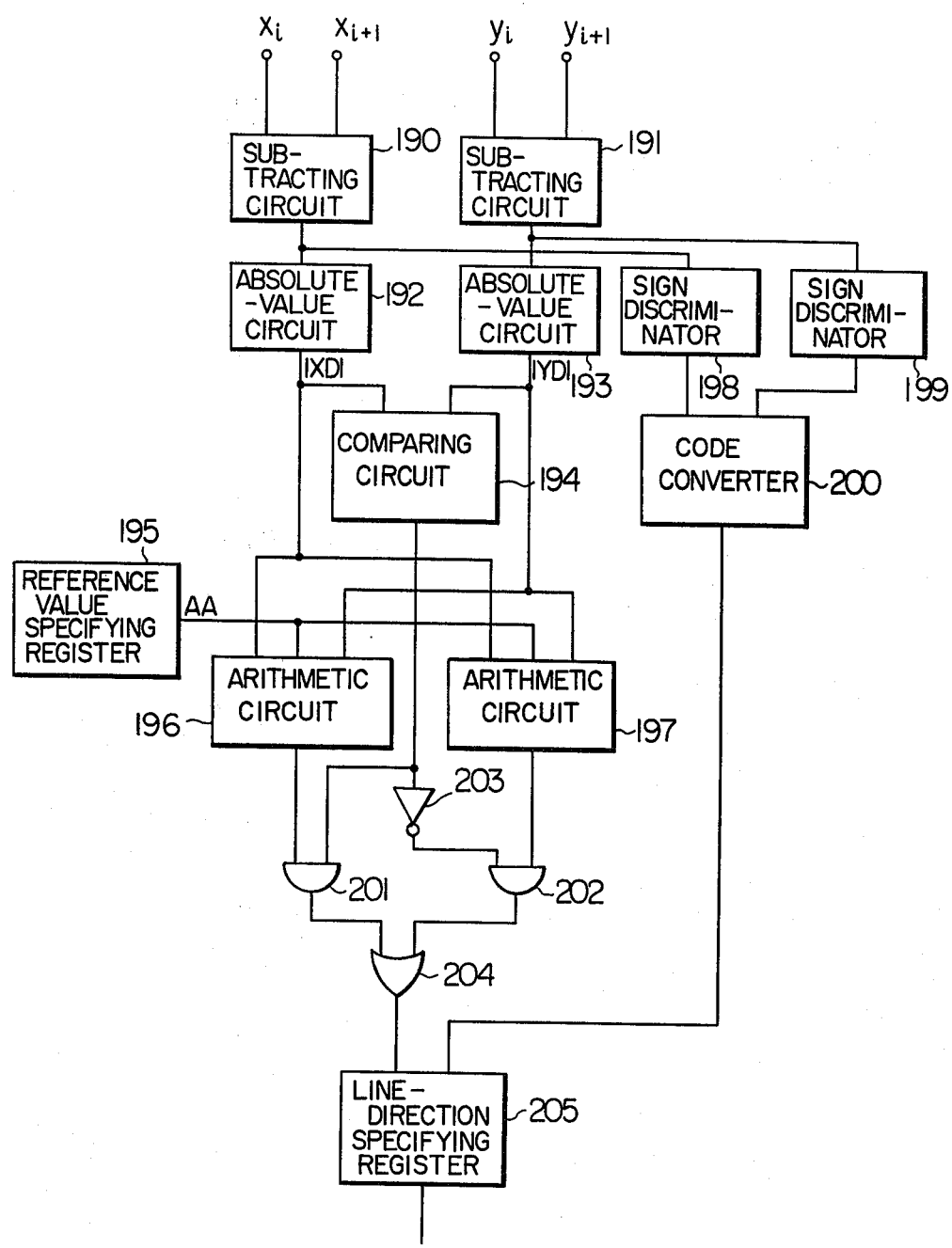
FIG. 25 is a block diagram of an example of the line-direction measuring circuit 172 in FIG. 24.

FIG. 25 is a specific arrangement of the line-direction measuring circuit 172 in FIG. 24. Shown at 190 and 191 are subtracting circuits, 192 and 193 absolute-value circuits, 194 a comparing circuit, 195 a reference value specifying register, 196 and 197 arithmetic circuits, 198 and 199 sign discriminators, 200 a code converter, 201 and 202 AND gates, 203 a NOT gate, 204 an OR gate, and 205 a line direction specifying register.

In FIG. 25, $(X_i, Y_i)$ and $(X_{i+1}, Y_{i+1})$ each represent the coordinates of an end point of a line segment, and XD and YD the distances between both end points in the X- and Y-direction, respectively as shown by Equation (1).

$$XD = X_i - X_{i+1}$$
$$YD = y_i - y_{i+1} \quad (1)$$

Figures 26, 27:
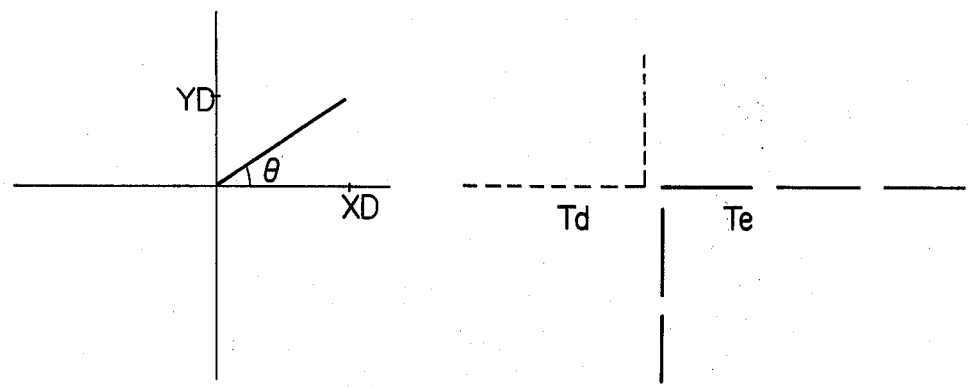
FIG. 26 is a explanatory diagram showing the relation of the angle $\theta$ and the X- and Y-direction distances between end points.
FIG. 27 is an explanatory diagram of two dash lines Td and Te having line segments of the same direction and different line lengths.

The values of XD and YD determine an angle $\theta$ as shown in FIG. 26. The value of this angle $\theta$ is determined by the following equation:

$$\theta = \frac{\text{MIN}(|XD|, |YD|) \times 45°}{\text{MAX}(|XD|, YD)} \quad (2)$$

Thus, when $|XD| \geq |YD|$, the direction of the line segment, or the angle with respect to the horizontal axis is expressed directly by the angle $\theta$, but when $|XD| < |YD|$, the angle of line segment is expressed by $90° - \theta$.

The arithmetic operation therefor is performed in the following way.

The distances XD and YD in the X- and Y-direction are determined by the subtracting circuits 190 and 191, respectively and the absolute values |XD| and |YD| by the absolute-value circuits 192 and 193, respectively.

The reference register 195 stores 45° of reference angle. Thus, the arithmetic circuits 196 and 197 are supplied with the output of the register 195 and the outputs of the absolute value circuits 192 and 193, and compute therefrom the angle $\theta$ as represented by eq. (2) and $\theta - 90°$. The comparing circuit 194 compares the absolute values |XD| and |YD| and supplies an output "1" to the AND gate 201 or 202 in response to the compared results. Thus, the output of the arithmetic circuit 196 or 197 is stored in the line-direction specifying register 205 through the OR gate 204. Specifically, when $|XD| \geq |YD|$, the comparing circuit 194 produces an output of "1", and thus the value of $\theta$ determined by the arithmetic circuit 196 is stored in the register 205. When $|XD| < |YD|$, the comparing circuit 194 produces an output of "0", upon which the NOT gate 203 produces an output of "1", thereby permitting the register 205 to store the value of $90° - \theta$ determined by the arithmetic circuit 197.

On the other hand, the sign discriminators 198 and 199 discriminate the signs of the outputs XD and YD of the subtracting circuits 190 and 191, the results of discrimination being converted in code by the code converter 200 and stored in the register 205. The output of this code converter 200 shows what quadrant the line segment direction belongs. The sign discriminators 198 and 199 discriminate the signs of the outputs XD and YD, deciding whether the sign bit is "0" or "1". The code converter 200 is used to express the quadrant of the line direction by a particular code, and can be realized by a simple gate arrangement or ROM. The given angle of 45° can be replaced by any integer according to required precision.

From FIG. 23, it will be apparent that a dash line can be recognized, and a chain line can also be recognized by comparing a plurality of line segment lengths. In this case if two dash lines of the same direction and different segment lengths, $T_d$ and $T_e$ are present as shown in FIG. 27, these lines are erroneously recognized as a single chain line.

If the one-dot chain line shown in FIG. 28a is treated as a dash line, as shown in FIG. 28b, by connecting each pair of adjacent line segments of different lengths which constitute the chain line, the above problem can be solved.

FIG. 29 is still another embodiment of the dash-line tracking device according to the invention, by which the above problem can be solved.

In FIG. 29, there are shown a different line segment connecting circuit 15 and other circuits 13, 14 and 15 similar to those in FIG. 23.

That is, to recognize and process a chain line as a dash line, the line-direction line-length determining circuit 13 selects a set of line segments of different lengths in a predetermined direction and supplies the selected segments to the suitable segment memory 14 so that they are stored therein. Then, the contents of the memory 14 are read and supplied to the different line-kind connecting circuit 16, where the adjacent line segments of different line lengths are connected to each other. The results of connection are again stored in the suitable segment memory 13.

For recognition of one-dot chain line, a dash line can be obtained by one-time processing, and for recognition of two-dot chain line, a one-dot chain line is obtained by the first processing and then a dash line is obtained by the second processing.

FIG. 30 is a specific embodiment of the line segment connecting circuit 16 in FIG. 29. Shown at 301 is a point-distance measuring circuit, 302 a comparing circuit, 303 a line-kind specifying register, 304 a point-distance specifying register, 305 a comparing circuit, 306 a selecting circuit, and 307 an AND gate.

In this arrangement, the line information of the line segment read from the suitable segment memory 14 is applied to the point-distance measuring circuit 301, where the distance between the end points of two segments is computed on the basis of the line information. On the other hand, the value of the distance between end points of line segments constituting a desired chain line is stored in advance in the point-distance register 304. The contents of the register 304 are applied to the comparing circuit 305 where it is compared with the computed output of the measuring circuit 301. If the compared difference is within an allowable range, the output 308 of the comparing circuit 305 becomes "1".

On the other hand, the line-kind specifying register 303 stores in advance line-kind information for specifying segments of different lengths constituting a chain line.

The comparing circuit 302 compares the line-kind information read from the suitable segment memory 14 and the contents of the register 303. If both information signals are coincident with each other, the output 309 of the comparing circuit 302, becomes "1".

Thus, if the outputs 308 and 309 are both "1", the AND gate 307 produces an output 310 of "1". The line information read from the suitable segment memory 14, as shown in FIG. 28a is applied to the selecting circuit 306, from which is then produced a line information of a dash line as shown in FIG. 28b. In other words, the end points $P_2$ and $P_3$ among the end points $P_1$, $P_2$, $P_3$ and $P_4$ of the two line segments $T_a$ and $T_b$ as shown in FIG. 28a are eliminated by connecting the line segments $T_a$ and $T_b$, as shown in FIG. 28b, by the selecting circuit 306. This results in the line segment $T_c$ having the end points $P_1$ and $P_4$. When the output 310 of the AND circuit 307 becomes "1", the suitable segment memory 14 stores the output 312 from the selecting circuit 306 and the line-kind information 311 from the line-kind specifying register 303.

In FIG. 30, the point distance measuring circuit 301 can be realized by the circuit of FIG. 20 similar to the measuring circuit 171. In this case, the input coordinates $(x_i, y_i)$, $(x_{i+1}, y_i1)$ are selected corresponding to the points $P_2$ and $P_3$ in FIG. 28a.

The present invention is not limited to the above mentioned embodiments, but other various embodiments and modifications can be made without departing from the spirit of the invention.

According to the invention, as described above, the kind of line can automatically be discriminated with a device of simple construction.

We claim:

1. An automatic line recognition method capable of reading a dash or chain line comprising:
   a first step of photoelectrically converting a pattern including a line plan consisting of a plurality of line segments separated by gaps and forming one or more dash or chain lines into a binary electrical signal and storing the signal in a first memory;
   a second step of tracking each line segment based on said signal stored in the first memory and detecting at least the coordinates of the end points of each of the line segments of finite length, and forming tables, each for a respective line segment, in a second memory;
   a third step of setting a certain range around one end point of a first line segment and searching the tables of other line segments so as to detect an end point of a second line segment among the end points of said other line segments present in said range which is spaced from and has a predetermined positional relationship with said first line segment; and
   a fourth step of connecting the first and the second line segments across the gap between one end point of a first line segment and an end point of said second line segment by substituting the coordinates of said one end point with those of the end point of the second line segment.

2. An automatic line recognition method according to claim 1, wherein said second step includes detecting end points and any bending point of each line segment.

3. An automatic line recognition method capable of reading a dash or chain line comprising:
   a first step of photoelectrically converting a pattern including a line plan consisting of a plurality of line segments separated by gaps and forming one or more dash or chain lines into a binary electrical signal and storing the signal in a first memory;
   a second step of tracking each line segment based on said signal stored in the first memory and detecting at least the coordinates of the end points of each of the line segments, and forming coordinate tables, each for a respective line segment, in a second memory;
   a third step of setting a certain range around one end point of a first line segment, and searching the tables of other line segments so as to detect and store in a third memory end points of second line segments present within said certain range as suitable points; and
   a fourth step of selecting a suitable point of a second line segment connectable to said first line segment from said third memory and connecting said second line segment to said first line segment across the gap between one end point of the first line segment and an end point of the second line segment.

4. A line recognition method according to claim 3, wherein said fourth step comprises, when the number of said suitable points is plural, selecting a suitable point satisfying the condition that the directions of the first and the second line segments and of an imaginary line segment connecting said one end point of the first line segment and the selected suitable point of the second line segment are in a predetermined range.

5. An automatic line recognition method according to any one of claims 1 to 4, further comprising:
   a step of calculating a distance between adjacent end points of the line segments along the path of a line constituted by connected line segments using coordinates stored in the second memory;
   a step of counting the numbers of segments belonging to predetermined ranges of distance for the connected line and forming a distribution of the numbers with respect to the distance; and
   a step of discriminating the kind of line specified by the constituted segments from said distribution.

6. An automatic line recognition method according to any one of claims 1 to 4, further comprising
   a step of calculating the length of each segment constituting a line using coordinates stored in the second memory;
   a step of classifying the segments with respect to the calculated length, counting the number of segments for each classified length of line segment and forming a histogram of the number of segments with respect to the length;

a step of counting the total number of line segments connected in a line and normalizing said histogram by the total number; and a step of deciding the kind of line from the shape of the normalized histogram.

7. An automatic line recognition method capable of reading a dash or chain line comprising:

a first step of picking up a pattern including a line plan consisting of a plurality of line segments, generating an electrical signal representing the picked-up plan and storing the signal in a first memory;

a second step of tracking each line segment based on the signal stored in the first memory and detecting at least end points of each of the picked-up segments and forming tables, each for each line segment, in a second memory;

a third step of calculating the length and the direction of each segment and selecting line segments of the same direction and specified length using information stored in the second memory;

a fourth step of setting a predetermined range around an end point of a line segment and searching the tables of other selected line segments to find an end point in the range; and a fifth step of connecting two line segments in accordance with the result of the fourth step.

8. A line recognition method according to claim 7, wherein said third step includes selecting line segments having the same direction and a predetermined length.

9. An automatic line recognition method according to claim 8, wherein said third step includes selecting pairs of adjacent line segments having the same direction and different line lengths, checking whether the distance between end points of the adjacent line segments of different lengths is within a predetermined range or not, and connecting the line segments to form a new line segment when the distance is within the certain range.

10. A method of automatically reading a line plan, capable of recognizing a segmented line, such as a dash or chain line, formed of line segments having gaps therebetween, as a continuous line, comprising the steps of:

storing, in a first memory, a table for each line segment containing coordinates of feature points including end points where the line segment starts and ends and any bending point at which the line segment changes its direction;

selecting a first end point of a first line segment and registering the coordinates of said first end point;

selecting a second end point of a second line segment and registering the coordinates of said second point;

comparing the coordinates of said first and second end points and generating a gap signal representing the length of the gap between the line segments on the basis of the difference of the coordinates of said first and second end points;

discriminating the gap signal by the magnitude of said difference and generating a first gating signal when the difference is in a predetermined range;

storing data of said second line segment in the form of a table in a second memory upon generation of said first gating signal; and forming a table in a third memory by combining the data of said first and second line segments and eliminating data on said first and second end points, thereby connecting said first and second line segments in a line across the gap therebetween.

11. A method according to claim 10, wherein said step of forming a table in a third memory comprises extending the table in the first memory at least by substituting coordinates of said first end point with those of the other end point of the second line segment opposite to said second end point.

12. A method according to claim 10, further comprising the steps of:

calculating the directions of said first and second line segments and of an imaginary line connecting said first and second end points and generating direction signals representing said directions;

discriminating the direction signals and generating a second gating signal when the direction signals are in a predetermined range; and said data storing step storing data upon generation of both said first and second gating signals.

13. A method according to claim 10, further comprising the step of calculating the length of each line segment.

14. A method according to claim 12, further comprising the steps of:

classifying the line segments connected in a line by the length of the segment;

incrementing counters provided for respective ranges of the segment length by the classified segments; and discriminating the profile of the counters and generating a signal representing the profile.

15. A system for automatically reading a line plan, capable of recognizing a segmented line, such as a dash or chain line, formed of line segments having gaps therebetween, as a continuous line, comprising:

a first memory for storing a table for each line segment containing coordinates of feature points including end points where the line segment starts and ends and any bending point where the line segment changes its direction;

means for selecting a first end point of a first line segment and registering the coordinates of said first end point;

means for selecting a second end point of a second line segment and registering the coordinates of said second point;

means for comparing the coordinates of said first and second end points and generating a gap signal representing the length of the gap between the line segments on the basis of the difference of the coordinates of said first and second end points;

means for discriminating the gap signal by the magnitude of said difference and generating a first gating signal when the difference is in a predetermined range;

means including a second memory for storing the data of said second line segment in the form of a table in the second memory upon generation of said first gating signal; and means including a third memory for forming a table in the third memory by combining the data of said first and second line segments and eliminating data on said first and second end points, thereby connecting said first and second line segments in a line across the gap therebetween.

16. A system according to claim 15, wherein said third memory is part of said first memory which extends the table at least by substituting coordinates of said first end point with those of the other end point of the second line segment opposite to said second end point.

17. A system according to claim 14, further comprising:
  means for calculating the directions of said first and second line segments and of an imaginary line connecting said first and second end points and generating direction signals representing said directions;
  means for discriminating the direction signals and generating a second gating signal when the direction signals are in a predetermined range; and
  said means including the third memory storing data upon generation of both said first and second gating signals.

18. A system according to claim 14, further comprising means for calculating the length of each line segment.

19. A system according to claim 16, further comprising:
  means for classifying the line segments connected in a line by the length of the segment;
  counters for counting the number of line segments in respective ranges of the segment length; and
  means for discriminating the profile of the counters and generating a signal representing the profile.

* * * * *